United States Patent [19]

Bisiach

[11] 4,151,390
[45] Apr. 24, 1979

[54] TOOL HOLDER HEAD, PARTICULARLY FOR WELDING YOKES AND GUNS

[76] Inventor: Luciano Bisiach, Strada San Vito Revigliasco N. 350, Turin, Italy

[21] Appl. No.: 821,735

[22] Filed: Aug. 4, 1977

[51] Int. Cl.$^2$ .............................................. B23K 37/02
[52] U.S. Cl. ........................... 219/124.10; 219/60 A; 219/69 R; 219/124.33
[58] Field of Search ............ 219/124.10, 124.22, 219/124.33, 125.10, 125.12, 69 R, 60 A

[56] References Cited

U.S. PATENT DOCUMENTS

| | | | |
|---|---|---|---|
| 1,728,972 | 9/1929 | Krebs | 219/125.1 X |
| 2,183,219 | 12/1939 | Hollesen | 219/86.25 X |
| 2,773,968 | 12/1956 | Martelloitti | 219/69 R |
| 2,987,939 | 6/1961 | Waninger | 219/124.1 X |
| 3,100,832 | 8/1963 | Sosoka | 219/86.25 |
| 3,665,148 | 5/1972 | Yasenchak | 219/86.33 X |
| 3,806,691 | 4/1974 | Roach | 219/69 R |

FOREIGN PATENT DOCUMENTS 1481151  5/1967  France ................................. 219/69 R

*Primary Examiner*—Richard R. Kucia
*Attorney, Agent, or Firm*—Paul & Paul

[57] ABSTRACT

A tool holder head, particularly for supporting a welding yoke or gun in a welding machine, enables the welding gun to be moved in three degrees of freedom. The head comprises a bushing rigidly mounted on a movable support member of the machine and three hollow shafts movably mounted one within the other in the bushing and each driven by a separate motor and connected by gear means to a tool support.

8 Claims, 4 Drawing Figures

TOOL HOLDER HEAD, PARTICULARLY FOR WELDING YOKES AND GUNS

This invention relates to a tool holder head for mounting on tool machines movable along two or more axes, particularly automatic welding machines, in which the tool is a resistance welding yoke or welding gun for TIG, MIG or MAG welding. This tool holder head can be used particularly for welding sheet metal workpieces for making metal casings such as cabinets or cases for household appliances and the like, car bodies, and housings for other machines.

Machines movable along two or more axes are known which can be controlled by programmed control means to carry out complex working movements and operations on workpieces. When the tool is a resistance welding yoke or welding gun for TIG, MIG or MAG, it is difficult to position the tool because it has to be placed correctly not only with respect to its location but also set to the workpiece with a predetermined orientation including two angular coordinates, as the complex nature of the casing or other blank to be assembled requires the tool to be set to the workpiece each time in a different direction. Also when the tool has been brought into the desired orientation it must be capable of turning about its axis to take the correct position relative to the surfaces to be welded.

Another problem of both resistance and arc welding has been the supply of the required large current to the welding yoke or gun. Such current, which usually is in the order of at least 10 kiloamperes, is supplied by large and heavy transformers, and the common prior art practice has been to locate the transformer in a stationary position on the machine and to lead a suspended cable from the transformer to the tool holder head. As this cable must permit movement of the tool holder head during the welding program, it has had a considerable length, typically a few meters. Consequently, the loss of power along the cable has been relatively, even when the cross section of the conductors has a large area.

Further, during movement of the tool holder head, the cable has been subjected to continuous heavy bending and twisting which, in association with the considerable weight and rigidity of the cable, due to the large size conductors employed, has led to a rapid deterioration of the cable which consequently has had to be replaced frequently. This has caused a heavy increase in the running cost of the machine in addition to the cost of the power lost in the cable.

It is therefore an object of the present invention to provide a tool holder head of the type indicated above, which permits one to avoid using suspended cables and to reduce the length of the cable used and to avoid any stress thereon, thus eliminating not only loss of power in the cable but also deterioration of the cable by fatigue.

Another object of the present invention is to provide a tool holder head which is compact and self-contained, in order to improve the accuracy of the tool positioning with respect to the workpiece.

The invention thus provides a tool holder head for mounting on machines movable along two or three axes, which permits a tool, particularly a welding yoke or gun to be moved in three degrees of freedom.

Other objects and advantages of the invention will appear from the following description.

These objects are achieved according to the present invention by a tool holder head for mounting on machines movable along two or more axes, particularly for supporting a welding yoke or gun for welding sheet metal workpieces for making metal casings and the like, which comprises:
- a bushing rigidly mounted on a movable support of said machine;
- an outer hollow shaft having at one end a first journal bearing at an oblique axis to and intersecting the axis of said shaft;
- an intermediate hollow shaft rotatably and coaxially mounted within said outer hollow shaft and having a first bevel gear at the end adjacent said first journal bearing
- an inner shaft rotatably and coaxially mounted within said intermediate hollow shaft and having a second bevel gear at the end adjacent said first journal bearing
- first driving means on said bushing for rotating said outer shaft by desired angular increments with respect to said bushing;
- second driving means on said outer shaft for rotating said intermediate shaft by desired angular increments with respect to said outer shaft;
- third driving means on said outer shaft for rotating said inner shaft by desired angular increments relative to said outer shaft;
- a first driven member rotatably mounted on said first journal bearing and having a third bevel gear meshing with said first bevel gear, said first driven member including a second journal bearing arranged coaxially with said first journal bearing and a third journal bearing having an oblique axis relative to and intersecting the axis of said second journal bearing;
- a second driven member rotatably mounted in said second journal bearing and having a fourth bevel gear meshing with said second level gear, said second driven member being further provided with a fifth bevel gear opposed to said fourth bevel gear, and
- a third driven member rotatably mounted on said third journal bearing and having a sixth bevel gear meshing with said fifth bevel gear, said third driven member supporting a tool.

A preferred embodiment of the invention will now be described by way of example and with reference to the accompanying drawings, in which.

Figure 1:
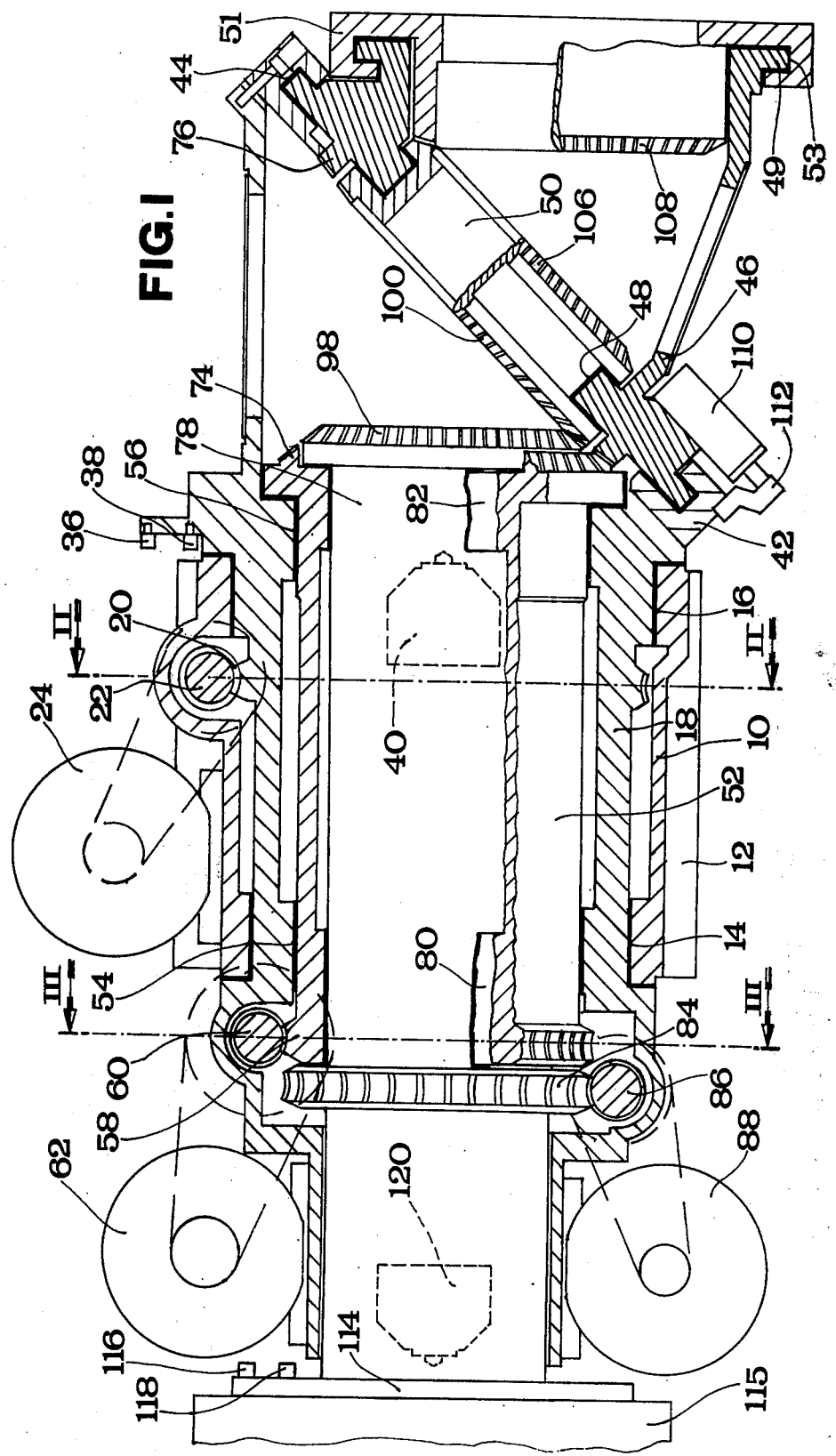
FIG. 1 is a longitudinal cross-section through a tool holder head according to the present invention.
Figure 2:
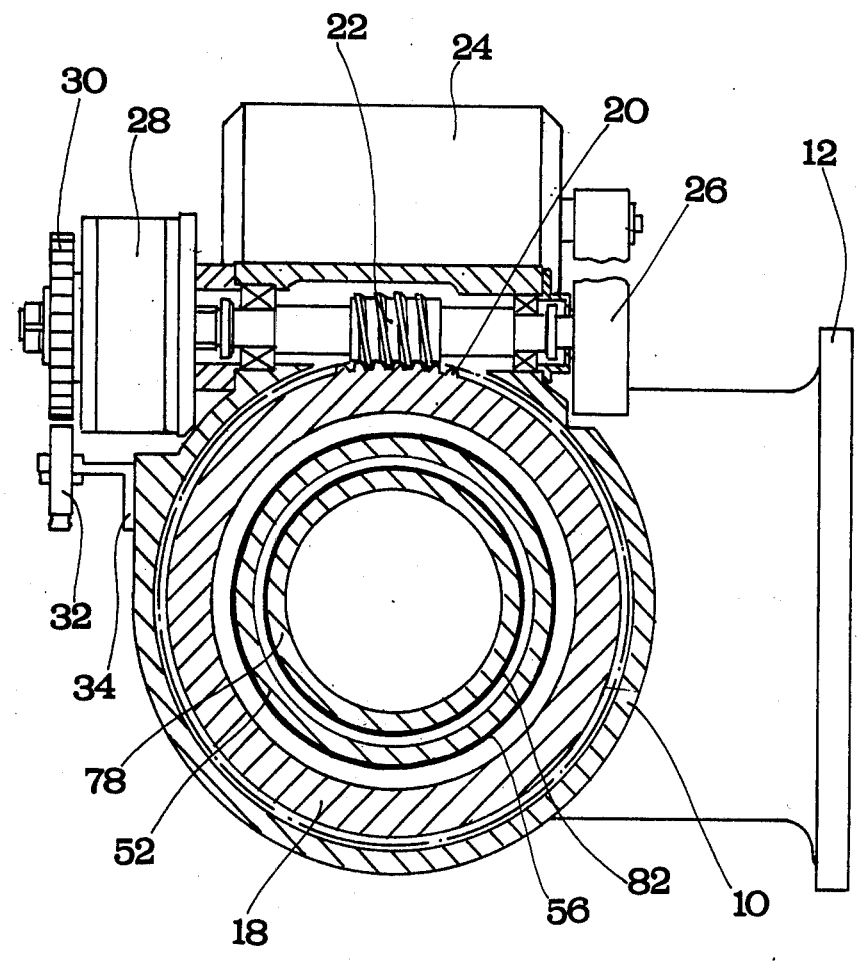
FIG. 2 is a transverse cross-section taken along the line II—II in FIG. 1.
Figure 3:
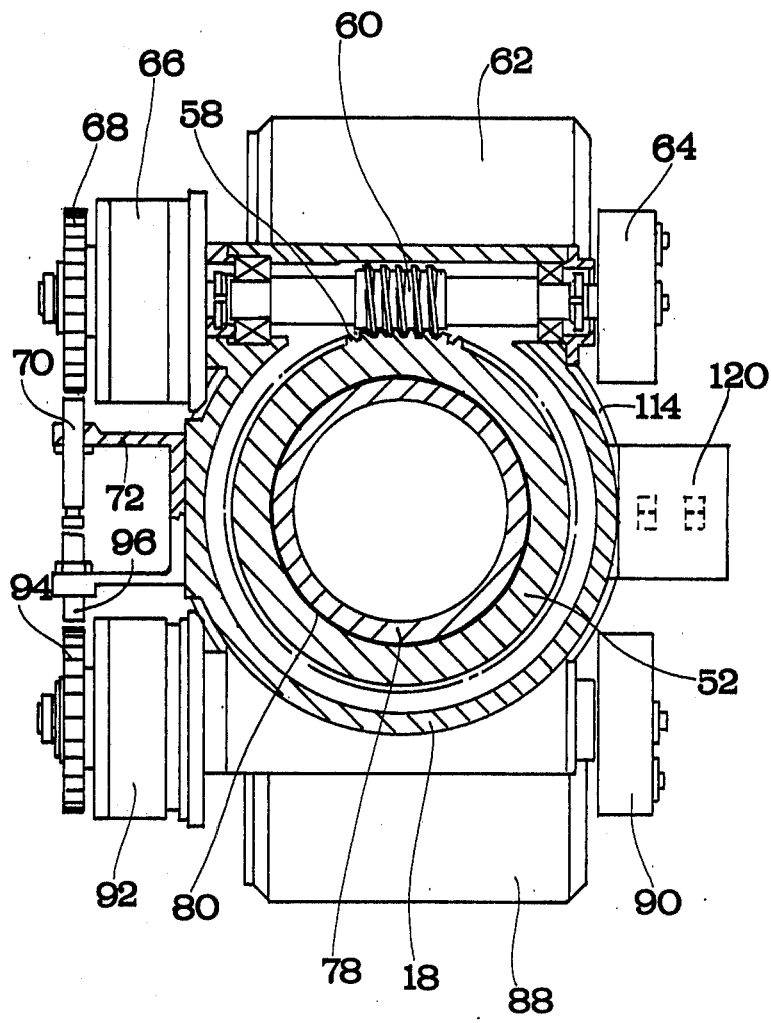
FIG. 3 is a transverse cross-section taken along the line III—III in FIG. 1
Figure 4:
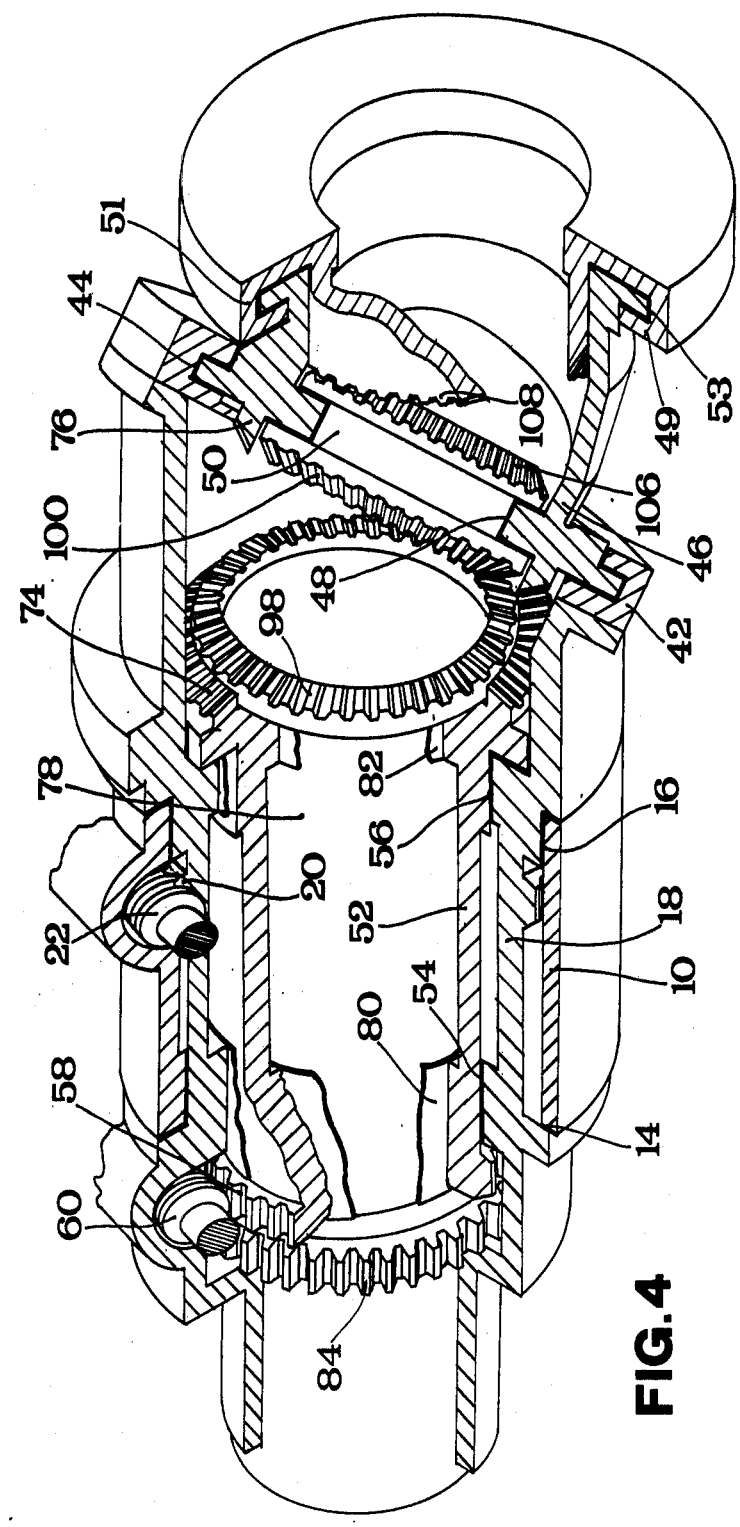

FIG. 4 is a longitudinal sectional perspective view with parts being broken away to show details of the tool holder head of the present invention Referring to FIGS. 1 through 3, a tool holder head according to the invention comprises a bushing 10 provided with a lateral flange means 12 for securing it to a movable member of a machine of the type specified (not shown).

Rotatably supported within the bushing 10 by means of friction linings 14, 16 is an outer hollow shaft 18 provided with a crown gear 20 meshing with a worm 22 rotatably supported transversely of the bushing 10 and driven by an electric motor 24, secured to the body of the bushing 10, through a cogged transmission belt 26. The friction linings 14, 16 preferably consist of thin layers of self-lubricating plastic material. The worm 22 is coupled to an electromagnetic brake 28 so that the worm can be stopped substantially instantaneously. Further coupled to the worm 22 is a toothed "tone" wheel 30 cooperating with a proximity sensor 32 secured to the body of the bushing 10 by means of a mounting bracket 34. With this arrangement the proximity sensor 32 provides in a conventional manner a series of electric output pulses the number of which is proportional to the angle through which the tone wheel 30 rotates.

The outer shaft 18 also carries a pair of cams 36, 38 cooperating with a double microswitch 40 mounted on the body of the bushing 10 for detecting limit positions in the rotational movement of the shaft 18.

At the right end of the outer shaft 18, as shown in FIG. 1, this shaft carries a journal bearing 42 arranged with its axis oblique at an angle of 45° to the axis of the shaft 18 and intersecting this axis. Rotatably mounted in the journal bearing 42, by means of a friction lining 44 of the same self-lubricating plastic material mentioned above, is a first driven member 46 which in turn carries a second journal bearing 47, extending coaxially to the first journal bearing, and a third journal bearing 49 arranged with its axis oblique at an angle of 45° to the axis of the second journal bearing. The second journal bearing 47 rotatably supports a ring 50 through a further friction lining 48 of the same type and the third journal bearing 49 rotatably supports an end flange support 51 for mounting a tool such as a welding yoke (not shown), also with the interposition of a friction lining 53 of the same type.

Rotatably supported within the outer hollow shaft 18 is a second intermediate hollow shaft 52 by means of friction linings 54, 56, preferably also formed of thin layers of the same self-lubricating plastic material. The intermediate shaft 52 carries a crown gear 58 driven by a worm 60 rotatably supported transversely on the outer hollow shaft 18 and driven by an electric motor 62 similar to the electric motor 24, through a cogged transmission belt 64.

As shown in FIG. 3, the worm 60 is coupled to an electromagnetic brake 66 similar to the electromagnetic brake 28 and also carries a toothed tone wheel 68 similar to the tone wheel 30 and cooperating with a proximity sensor 70 stationarily mounted on the intermediate hollow shaft 52 by means of a bracket 72 for purposes similar to those of the proximity sensor 32 shown in FIG. 2.

As shown in FIG. 1, at the right end of the hollow intermediate shaft 52 this shaft is provided with a bevel gear 74 meshing with a bevel gear 76 on the driven member 46. Therefore, the rotation of the intermediate shaft 52 produced by the electric motor 62 causes rotation of the driven member 46 relative to the outer shaft 18.

Within the intermediate hollow shaft 52 there is finally rotatably supported a third inner shaft 78, also preferably hollow, by means of a further pair of friction linings 80, 82, also preferably made of the abovementioned self-lubricating plastic material. The inner shaft 78 is provided with a crown gear 84 meshing with a worm 86 rotatably supported transversely on the outer hollow shaft 18 and driven, in the same manner as the worm 60, by an electric motor 88 secured to the outer hollow shaft 18, through a cogged transmission belt 90.

The worm 86 is also subjected to the action of an electromagnetic brake 92 and carries a tone wheel 94 cooperating with a proximity sensor 96 mounted on the outer hollow shaft 18 to provide electric signals indicating the angle of rotation of the worm 86.

As shown in FIG. 1, at the right end of the inner shaft 78, this shaft is provided with a bevel gear 98 extending coaxially to the bevel gear 74 and meshing with a bevel gear 100 on the ring 50. On its opposite side the ring 50 has another bevel gear 106 meshing with a bevel gear 108 provided on the flange 51 coaxially of its axis of rotation.

Secured to the driven member 46 is a double microswitch 110 cooperating with cams 112 on the journal bearing 42 of the outer shaft 18 for detecting limit positions of the rotational movement of the driven member 46 relative to its journal bearing.

At the left end, as shown in FIG. 1, the inner shaft 78 is provided with a flange 114 for supporting an electric transformer 115 for feeding current to the tool (not shown). As the shaft 78 is likewise preferably hollow and both the ring 50 and the flange 51 have relatively wide central openings, there is ample space between the flanges 114 and 51 in the tool holder head for accommodating an electric power supply cable (not shown) for feeding current from the transformer to the welding yoke or gun.

Mounted on the flange 114 of the inner shaft 78 is a pair of cams 116, 118 cooperating with a double microswitch 120 arranged on the outer shaft 18 to detect limit positions of movement of the inner shaft 78 relative to the outer shaft 18.

Considering the structure of the tool holder head thus described, it will be evident that by combining the individual movements of the three coaxial shafts 18, 52 and 78 relative to the bushing 10, and, due to the kinematic connection of these shafts with the respective driven members 46, 50, 51 the flange 50 may assume any orientation within a hemisphere. Further, in addition to taking the desired orientation, the tool may also take any desired angular position around its axis.

The rotation of the tool about its axis is caused by the rotation of the flange 51 on its journal bearing, which is further caused by the rotation of the inner shaft 78. Rotation of the intermediate shaft 52 causes rotation of the driven member 46 and thus a wobbling movement of the flange 51 relative to the journal bearing 42. Finally, rotation of the outer shaft 18 will cause the driven member 42 to wobble and therefore, by interaction with the wobbling movement of the flange 51 (i.e. by combination of the movement of the outer shaft 18 with that of the intermediate shaft 52), the desired orientation of the flange 51, and of the tool carried thereby, is obtained.

By the use of the electric driving means with electromagnetic brake on each of the shaft driving worms as well as the three tone wheels for detection of the angular movements of the shafts, and with the aid of the shaft limit switches, the movements of the tool holder head can be programmed concurrently with the movements of the movable support member of the tool machine, for carrying out programmed sequences of operations with the use of programming devices known per se.

As the transformer is mounted on the flange 114 of the outer shaft and the electric power supply cable for the welding yoke is arranged in the inner passage leading through the tool carrier head, no suspended cables need be used and the length of such cable, and consequently the power dissipated thereby, can be considerably reduced. It should be noted that during movement of the various shafts and members of the tool holder head, the tool supporting flange 51 and the flange 114 supporting the transformer 115 rotate together and therefore the power supply cable extending from the transformer to the tool is not subjected to severe twisting or bending stresses. In fact, even assuming the case of maximum bending, which occurs when the flange 51 is positioned perpendicularly to the flange 114, the two opposed ends of the power supply cable will be located at an angle to each other which does not exceed 90°. Therefore, wear on the cable is reduced and it is expected that it will have a useful life of many months or years as compared with a useful life of less than one month of the conventional suspended cables in the same circumstances.

Although a preferred embodiment of the invention has been described herein in detail and illustrated in the accompanying drawings it will be evident to those skilled in the art that numerous changes and modifications may be made therein without departing from the scope of the invention as defined by the appended claims. In particular, the shaft driving means comprising a worm and crown wheel could be replaced by other motion transmission means without changing the location of the motors on the bushing and outer shaft, respectively. Further, although friction linings made of self-lubricating plastic material are used in the preferred embodiment described and illustrated, it is evident that such friction linings may be replaced, completely or in part, by other types of linings, such as roller bearings. Finally, although throughout the foregoing specification reference has been made only to a tool holder head for mounting a welding yoke or gun, it will be evident that this tool holder head can also be used for supporting other tools.

I claim:

1. A tool holder head for mounting on machines movable along two or more axes, particularly for supporting a welding yoke or gun for welding sheet metal workpieces for making metal casings and the like, which comprises:
   a bushing rigidly mounted on a movable support of said machine;
   an outer hollow shaft having at one end a first journal bearing arranged at an oblique axis to and intersecting the axis of said shaft;
   an intermediate hollow shaft rotatably and coaxially mounted within said outer hollow shaft and having a first bevel gear at the end adjacent said first journal bearing;
   an inner shaft rotatably and coaxially mounted within said intermediate hollow shaft and having a second bevel gear at the end adjacent said first journal bearing;
   first driving means on said bushing for rotating said outer shaft by desired angular increments with respect to said bushing;
   second driving means on said outer shaft for rotating said intermediate shaft by desired angular increments with respect to said outer shaft;
   third driving means on said outer shaft for rotating said inner shaft by desired angular increments relative to said outer shaft;
   a first driven member rotatably mounted on said first journal bearing and having a third bevel gear meshing with said first bevel gear, said first driven member including a second journal bearing arranged coaxially to said first journal bearing and a third journal bearing having an oblique axis relative to and intersecting the axis of said second journal bearing;
   a second driven member rotatably mounted in said second journal bearing and having a fourth bevel gear meshing with said second level gear, said second driven member being further provided with a fifth bevel gear opposed to said fourth bevel gear, and
   a third driven member rotatably mounted on said third journal bearing and having a sixth bevel gear meshing with said fifth bevel gear, said third driven member supporting a tool.

2. The tool holder head of claim 1, wherein the axis of said first bearing is arranged at an angle of about 45° with respect to the axis of said outer shaft and the axis of said third bearing is arranged at an angle of about 45° with respect to the axis of said second driven member.

3. The tool holder head of claim 1, wherein said inner shaft and all of said driven members are hollow so as to define a central passage through the tool holder head for accommodating at least one power supply cable.

4. The tool holder head of claim 3, wherein said inner shaft is provided with an electric transformer supporting flange at its end opposed to that which carries said second bevel gear.

5. The tool holder head of claim 1, wherein friction linings made of thin layers of self-lubricating plastic material are interposed between said bushing and said outer shaft, between said outer shaft and said intermediate shaft, between said intermediate shaft and said inner shaft, between said first journal bearing and said first driven member, between said second bearing and said second driven member and between said third bearing and said third driven member.

6. A tool holder head as claimed in claim 1, wherein said first driving means comprises a first electric motor rigidly mounted on said bushing, a first crown gear peripherally mounted on said outer hollow shaft, and a first worm rotatably supported on and transversely of said bushing to mesh with said first crown gear, said first worm being driven by said first electric motor, said second driving means comprises a second electric motor, a second crown gear peripherally mounted on said intermediate hollow shaft, and a second worm rotatably supported on and transversely of said outer shaft to mesh with said second crown gear, said second worm being driven by said second electric motor, and said third drive means comprises a third electric motor, a third crown gear peripherally mounted on said inner hollow shaft, and a third worm rotatably supported on and transversely of said outer hollow shaft to mesh with said third crown gear, said third worm being driven by said third electric motor.

7. The tool holder head of claim 6, wherein each of said worms is coupled to and subjected to the action of an electromagnetic brake.

8. The tool holder head of claim 6, wherein each of said worms is arranged to drive a toothed tone wheel cooperating with a respective proximity sensor for detecting the degree of angular movement of the associated worm.

* * * * *